Patented Nov. 6, 1934

1,979,606

UNITED STATES PATENT OFFICE 1,979,606

PROCESS FOR PRODUCING WHITE LUMINOUS TUBES OF ELECTRIFIED NEON GAS

Rodolph de Lamprecht, Vancouver, British Columbia, Canada, assignor to The Cold White Light Inc., Seattle, Wash.

No Drawing. Application August 22, 1933, Serial No. 686,321

5 Claims. (Cl. 176—122)

This invention relates to a process for producing white luminous tubes of electrified neon gas.

Electrified neon gas as used in tubes for signs and various methods of advertising has recently come into greatly extended use on account of its low cost of upkeep, and the intrinsic value of its arresting power because of its vivid colour.

But its limitations have been very obvious and one of the greatest has been the inability to obtain by its use a luminous white light. This defect is eliminated by my invention which, by the aid of a simply performed but somewhat abstruse chemical reaction and following reactions, enables the well known scarlet colour of neon gas under suitable electrification to be rapidly bleached or changed, to give a distinctive white luminous appearance.

The process which I have discovered to produce this decolorizing or bleaching effect upon the neon gas as ordinarily used in tubes to obtain continuous luminosity, usually scarlet—but modified by various methods, chiefly empirical, to vary the colour effect—may be broadly stated to consist in the addition to the neon gas of a decolorizing gas at such a pressure as will not appreciably interfere with the pressure at which the neon gas has been found to most efficiently work.

The decolorizing gas is produced by adding sulphuric acid by comparatively small regular increments to zinc oxide, thus forming zinc sulphate and water. The zinc sulphate, owing to the rising temperature, is decomposed into zinc oxide, sulphurous anhydride and oxygen.

These partially recombine and form with the moisture sulphuric acid which falls on the zinc oxide again. As the temperature still continues to rise the zinc oxide vaporizes and is carried with a portion of the dry sulphurous anhydride and oxygen into the neon gas which is decolored thereby.

These chemical reactions are separate, simultaneous and continuous and may give rise to further more involved reactions. They may be symbolically stated as follows:

(1) $ZnO + H_2SO_4 = ZnSO_4 + H_2O$
(2) $ZnSO_4 + Heat = Zn + SO_4 + O$
(3) $ZnO + SO_2 + O + H_2O = H_2SO_4 + ZnO$ With the first application of current, the reaction, $ZnO + SO_2 + O + H_2O = H_2SO_4 + ZnO$, gives a cold, white luminous light at about 15,000 high frequency voltage. As an additional step or modification of my process, in order to reduce the resistance and at the same time reduce the voltage under low current and use the light on voltage of 220 and 110 and at the same time keep all the qualities of the first combination, I add, under a pressure of .007 m. m. A. T. (atmospheric tension) ether gas which becomes sulphuric ether. Under the application of the electric current this becomes compound ether which takes the formula $CH_3OC_2H_5$. This last combination which is formed from zinc oxide, sulphuric acid and ether gas, permits voltage of 220, 110, 12, 10, 8 and 6 volts D. C. or A. C. to excite the gases and produce a glow without any heat, but with luminosity. The gaseous reaction products, it should be understood, are added to the tubes containing neon gas and the tubes are then sealed.

Having now particularly described my invention, what I claim and desire to be protected in by Letters Patent, is:

1. A process for producing a white luminous effect in tubes comprising filling said tubes with neon gas and an addition of a decolorizing gas produced by adding in small regular increments sulphuric acid to zinc oxide, and ether gas, sealing said tubes and electrically energizing the tubes.

2. A process for producing a white luminous effect in tubes comprising filling said tubes with neon gas and an addition of a decolorizing gas produced by adding in small regular increments sulphuric acid to zinc oxide, electrically energizing the tubes for a period sufficient to give a white light, then adding ether gas to reduce the resistance whereby the tube may be further operated on low voltage substantially as described.

3. A process for lessening the electric resistance of neon gas in tubes that comprises the addition, under a pressure of .007 m. m. A. T., of ether gas thereto whereby the gases in the tube may be made to glow and become luminous by an electric current of 220, 100, 12, 10, 8 and 6 volts.

4. A process for reducing the heat of neon gases in tubes during luminosity that comprises lessening the electrical resistance of said gases by the addition of ether gas whereby the said gases may be made luminous by an electrical current of low potential.

5. The process of reducing the heat of neon gas in tubes during luminosity that comprises lessening the electrical resistance of said gases by the addition of ether gas whereby the gases in the tube may be made luminous by an electrical current of 220 volts or less to produce a cool light.

RODOLPH DE LAMPRECHT.